United States Patent
Rudd et al.

(10) Patent No.: US 6,934,915 B2
(45) Date of Patent: Aug. 23, 2005

(54) SYSTEM AND METHOD FOR PERSONALIZING AN ELECTRICAL DEVICE INTERFACE

(75) Inventors: Michael L Rudd, Fort Collins, CO (US); Jerlyn R Culp, Fort Collins, CO (US); James C Albritton-McDonald, Bellvue, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 497 days.

(21) Appl. No.: 09/974,431

(22) Filed: Oct. 9, 2001

(65) Prior Publication Data

US 2003/0067488 A1 Apr. 10, 2003

(51) Int. Cl.[7] .............................. G06F 3/00; G06K 15/00
(52) U.S. Cl. ....................... 715/765; 715/771; 715/865; 358/1.15; 358/1.13
(58) Field of Search ................................. 345/708, 719; 715/765, 866, 771, 773, 970, 708, 707, 705, 719, 764, 779, 865; 358/1.15, 1.13

(56) References Cited

U.S. PATENT DOCUMENTS

| | | | |
|---|---|---|---|
| 4,688,195 A | | 8/1987 | Thompson et al. |
| 5,287,514 A | * | 2/1994 | Gram .......................... 345/826 |
| 5,577,186 A | | 11/1996 | Mann, II et al. |
| 5,604,860 A | * | 2/1997 | McLaughlin et al. ....... 715/866 |
| 5,726,883 A | * | 3/1998 | Levine et al. ........... 715/970 X |
| 5,781,247 A | | 7/1998 | Wehmeyer et al. |
| 6,072,486 A | * | 6/2000 | Sheldon et al. ............. 345/835 |
| 6,222,537 B1 | * | 4/2001 | Smith et al. ................ 345/762 |
| 6,674,537 B2 | * | 1/2004 | Kadowaki ................... 358/1.15 |

* cited by examiner

Primary Examiner—Raymond J. Bayerl

(57) ABSTRACT

The present disclosure relates to such systems and methods for personalizing an electrical device interface. In one arrangement, personalization involves presenting a variety of different default interface options to the user, the interfaces being configured to control operation of an electrical device, receiving selection of a default interface made by a user, and presenting the selected interface to the user. Several other examples of interface personalization are described in detail in this disclosure.

32 Claims, 7 Drawing Sheets

SYSTEM AND METHOD FOR PERSONALIZING AN ELECTRICAL DEVICE INTERFACE

FIELD OF THE INVENTION

The present disclosure relates to a system and method for personalizing an electrical device interface.

BACKGROUND OF THE INVENTION

Consumer product manufacturers have historically provided the customer with various options for the look and feel of consumer products to allow the customer to purchase a product which meets his or her own sense of style. Under such circumstances, the consumer product, although functioning in substantially the same way for all persons, can be personalized to some degree to suit the customer's tastes.

Recently, this type of personalization has begun to be offered to purchasers of computers and other electronic devices. By way of example, several mobile telephone manufacturers provide a variety of different colored faceplates that can be removably snapped onto the purchased mobile telephone so that the customer can personalize the look of his or her telephone. To cite another example, the iMac™ computer produced by Apple Computer, Inc. is available in various different colors which the user may choose.

Personalization is also now available, albeit to a limited extent, for various software applications. For instance, most Windows™ operating systems allow the user to alter the look and feel of the user's desktop by selecting various color schemes, background patterns, etc. In addition, several Windows™ applications (e.g., Microsoft Word™) permit the user to select which onscreen "toolbars" and/or "buttons" are displayed to the user. Other examples of software personalization can be found online. For example, Yahoo!™ provides a service called "My Yahoo!" with which users can create their own "customized" home pages. With this service, the user can not only select color schemes for the home page but further can select what content (e.g., news, sports scores, stock market indices, travel information, weather) is presented to the user on the page.

Such software personalization is valuable to many users in that it permits the users to customize their software interfaces to suit their own sense of style and to tailor the interface to their personal needs. Unfortunately, this type of personalization is not currently provided in the electrical device interface context. Instead, purchasers of electrical devices (e.g., printers, copiers, scanners, digital cameras, etc.) that can be controlled with another device (e.g., personal computer) are normally provided with static user interfaces that cannot be modified. Even if such personalization where available for device interfaces, however, the limited nature of the types of personalization currently available would do little to customize the interfaces beyond mere aesthetics.

SUMMARY OF THE INVENTION

From the foregoing, it can be appreciated that it would be desirable to have a system and method for personalizing an electrical device interface with which the user can obtain meaningful interface customization. The present disclosure relates to such systems and methods of personalization.

In one arrangement, the system comprises means for presenting a variety of different default interface options to the user, the interfaces being configured to control operation of an electrical device, means for receiving selection of a default interface made by a user, and means for presenting the selected interface to the user.

In one arrangement, the method comprises presenting a variety of different default interface options to the user, the interfaces being configured to control operation of an electrical device, receiving selection of a default interface made by a user, and presenting the selected interface to the user.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

As noted above, meaningful personalization is not currently available for electrical device interfaces. Described herein are highly personalizable electrical device interfaces with which the user can control an electrical device. As is discussed in greater detail below, this personalization can range from merely changing the look and feel of the user interface to altering the way the interface is used and operated.

An example system for personalizing electrical device interface will first be described with reference to FIGS. 1 and 2. Although this system is described in detail, it will be appreciated that this system is provided for purposes of illustration only and that various modifications are feasible without departing from the inventive concept. After the description of the example system is provided, examples of operation of the system are provided that explain the manners in which personalization can be achieved.

Figure 1:
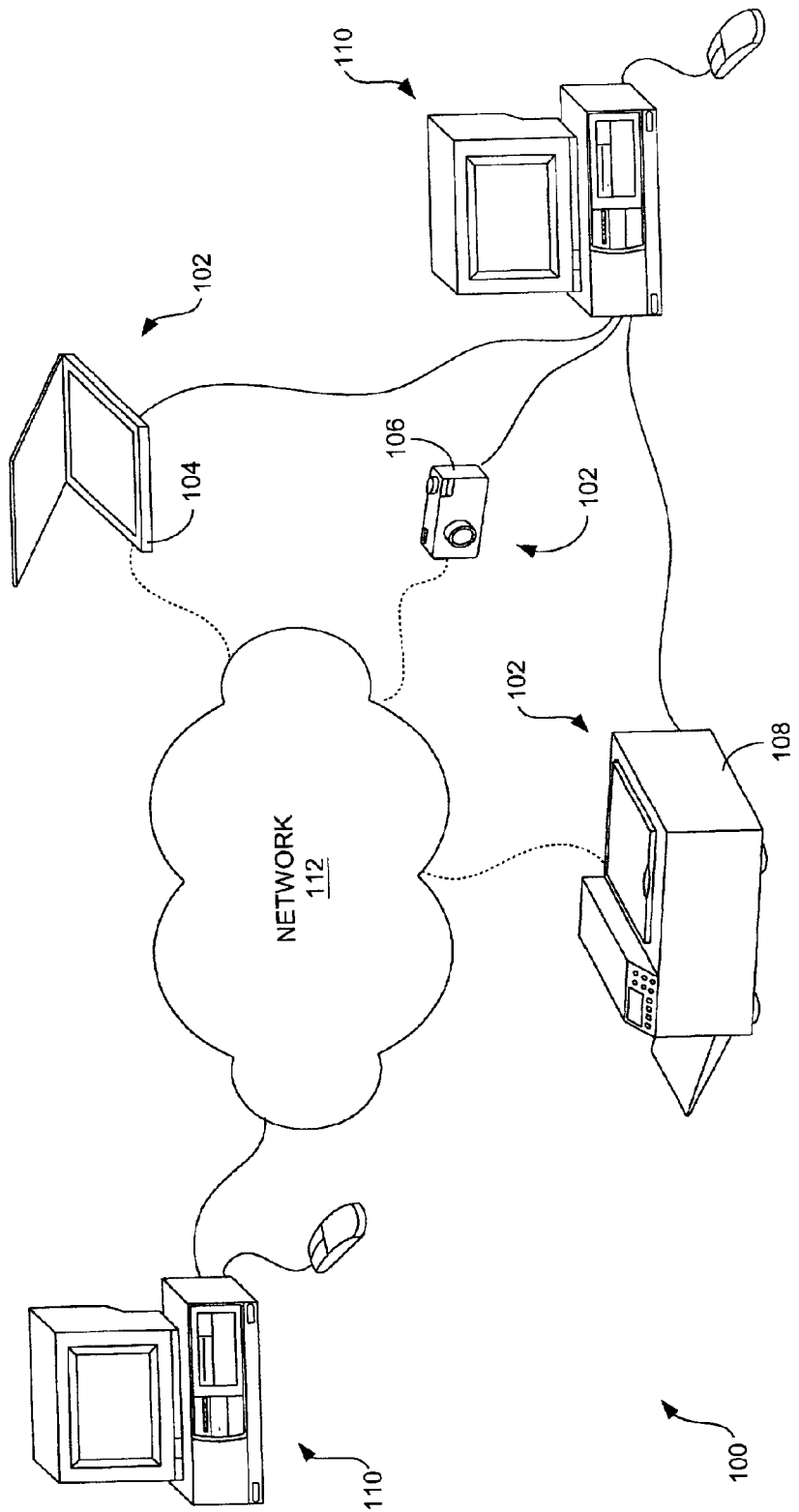
FIG. 1 is a schematic view of a system for personalizing an electrical device interface.

Referring now in more detail to the drawings, in which like numerals indicate corresponding parts throughout the several views, FIG. 1 illustrates a system 100 for personalizing an electrical device. As indicated in this figure, the system 100 can generally comprise one or more electrical devices 102. By way of example, the electrical devices 102 can comprise imaging devices such as a scanner 104, digital camera 106, and multi-function peripheral (MFP) device 108 which is capable of various different functionalities such as photocopying, printing, scanning, faxing, emailing, etc. However, as will become apparent to the reader from the description that follows, the electrical devices 102 can comprise substantially any electrical device with which a user can interface including, but not limited to, a printer, photocopier, facsimile machine, Internet appliance, personal digital assistant (PDA), mobile telephone, etc.

In addition to the electrical devices 102, the system 100 can include one or more computing devices 110. The computing devices 110 comprise substantially any device that is capable of use with the electrical device 102 and, more particularly, which is capable of communicating with the electrical device by transmitting data to and/or receiving data from the electrical device. Normally, such communications are controlled by the user with a graphical user interface (GUI) that can be presented to the user with a display of the device. By way of example, the computing devices 110 comprise personal computers (PCs). Although PCs are identified in FIG. 1 and discussed herein, it will be appreciated any one of the computing devices 110 could, alternatively, comprise another type of computing device.

As is further identified in FIG. 1, the electrical devices 102 and the computing devices 110 can, optionally, be connected to a network 112 that typically comprises one or more sub-networks that are communicatively coupled to each other. By way of example, these networks can include one or more local area networks (LANs) and/or wide area networks (WANs). Indeed, in some embodiments, the network 112 may comprise a set of networks that forms part of the Internet. As is depicted in FIG. 1, one or more of the computing devices 110 can be directly connected to the electrical devices 102. Such an arrangement is likely in a home environment in which the user does not have a home network and instead directly communicates to the electrical devices 102. In such a scenario, communication can be facilitated with a direct electrical and/or optical connection or through wireless communication.

Figure 2:
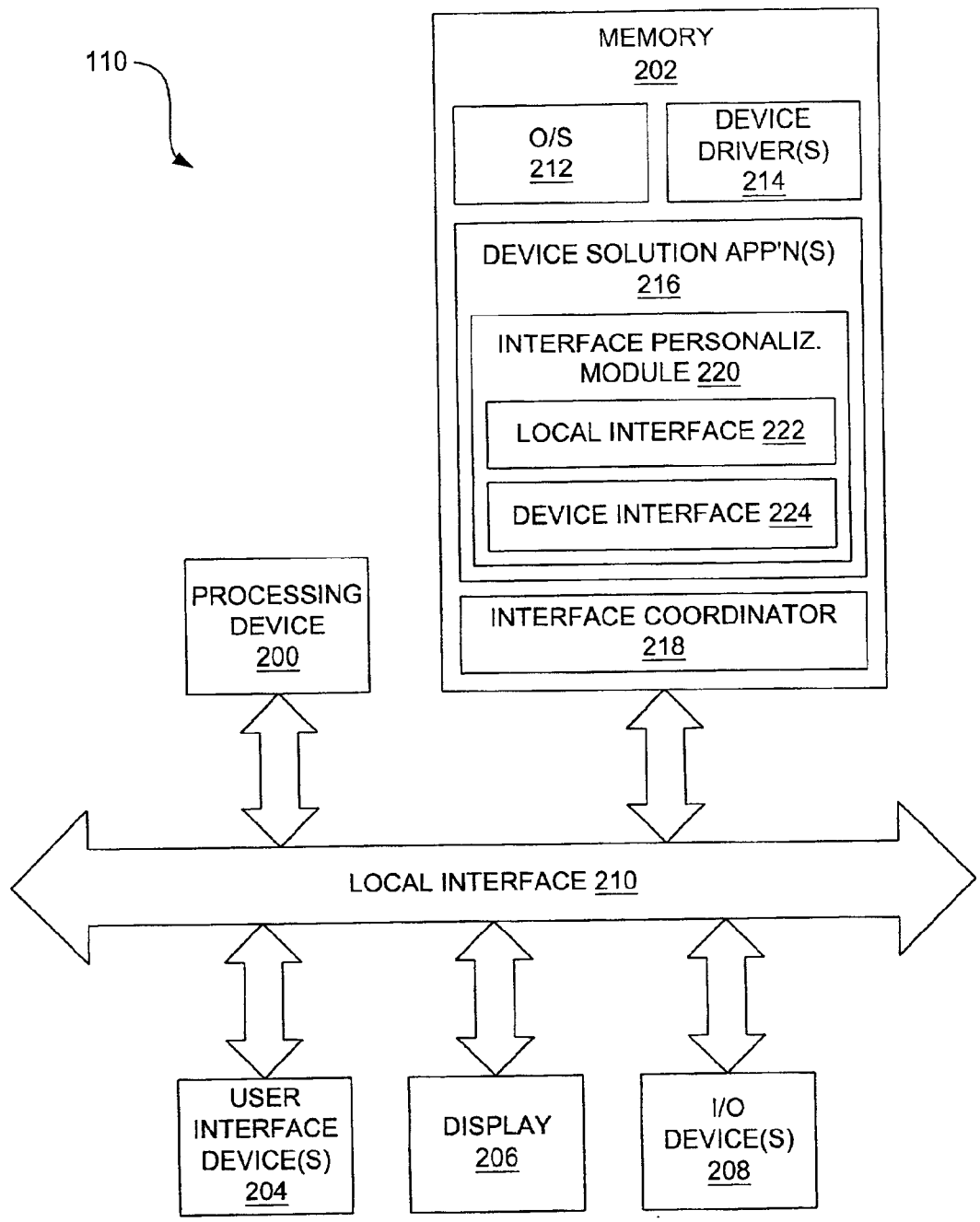
FIG. 2 is a schematic view of a computing device shown in FIG. 1.

FIG. 2 is a schematic view illustrating an example architecture for the computing devices 110 shown in FIG. 1. As indicated in FIG. 2, each computing device 110 can comprise a processing device 200, memory 202, one or more user interface devices 204, a display 206, and one or more I/O devices 208, each of which is connected to a local interface 210. The processing device 200 can include any custom made or commercially available processor, a central processing unit (CPU) or an auxiliary processor among several processors associated with the computing device 110, a semiconductor based microprocessor (in the form of a microchip), or a macroprocessor. The memory 202 can include any one of a combination of volatile memory elements (e.g., random access memory (RAM, such as DRAM, SRAM, etc.)) and nonvolatile memory elements (e.g., ROM, hard drive, tape, CDROM, etc.).

The one or more user interface devices 204 comprise those components with which the user can interact with the computing device 110. By way of example, these components comprise those typically used in conjunction with a PC such as a keyboard and mouse. Similarly, the display 206 can comprise a display typically used in conjunction with a PC such as a computer monitor. Where the computing device 110 is not a PC, it will be understood that various other user interface devices 204 and displays 206 may be used. The one or more I/O devices 208 comprise components that facilitate connection to the network 110 and/or direct connection to another device, such as the electrical devices 102.

The memory 202 normally comprises various software programs. Typically, these programs includes an operating system 212, one or more device drivers 214, one or more device solution applications 216, and an interface coordinator 218. The operating system 212 controls the execution of other software and provides scheduling, input-output control, file and data management, memory management, and communication control and related services. The device drivers 214 comprise the various software used to facilitate communications with the various electrical devices 102 to which the computing device 110 can connect (either directly or indirectly). The device solution applications 216 comprise software applications that can be run on the computing device 110 and used to control the operation of the electrical devices 102. Normally, the solution applications 216 are configured to generate GUIs that are presented to the user via the display 206 and with which the user can send commands to the electrical devices 102.

As indicated in FIG. 2, the solution applications 216 can each comprise an interface personalization module 220 that can be used to personalize (i.e., customize) the interfaces that are used to control the electrical devices 102. As is further indicated in FIG. 2, the interface personalization module 220 can be configured to facilitate local interface personalization (222) as well as device interface personalization (224) such that the interface presented to the user with the computing device 110 and the interface presented to the user on the electrical device 102 can be respectively modified. The nature of this personalization is the subject of the discussion that follows and is described in detail in relation to FIGS. 3–6. The interface coordinator 218 comprises software with which interface personalization can be effected across multiple interfaces, if desired. The operation of the interface coordinator 218 is described with reference to FIG. 7.

Various software and/or firmware programs have been described herein. It is to be understood that these programs can be stored on any computer readable medium for use by or in connection with any computer related system or method. In the context of this document, a computer readable medium is an electronic, magnetic, optical, or other physical device or means that can contain or store a computer program for use by or in connection with a computer related system or method. These programs can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium include an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium can even be paper or another suitable medium upon which a program is printed, as the program can be electronically captured, via for instance optical scanning of the paper or other medium, then compiled, interpreted or otherwise processed in a suitable manner if necessary, and then stored in a computer memory.

An example system 100 having been described above, operation of the system will now be discussed. In the discussion that follows, flow diagrams are provided. It is to be understood that any process steps or blocks in these flow diagrams represent modules, segments, or portions of code that include one or more executable instructions for implementing specific logical functions or steps in the process. It will be appreciated that, although particular example process steps are described, alternative implementations are feasible. Moreover, steps may be executed out of order from that shown or discussed, including substantially concurrently or in reverse order, depending on the functionality involved.

In a first manner of personalization, the user can select various default interfaces that are provided by the electrical device manufacturer or by third party software providers. In this manner of personalization, the user can change the aesthetics as well as the functionality of the interfaces to suit his or her preferences and/or needs. In terms of aesthetics, the default interfaces can be configured so as to have various color schemes, sounds, and themes that change the appearance of and the user experience with the interfaces. Examples include an industrial theme in which the interface has a metallic look, a children's theme in which vibrant colors, interesting icons, and unusual sounds are provided, etc.

As for functionality, the interfaces can be configured for operation in different modes. These different modes can present different command options (and therefore electrical device functions) to the user that are pertinent to a particular type of use. For instance, one interface can be geared toward a business mode and can comprise commands that are typically used in office environments. Where the electrical device 102 comprises an image capture device, such as a scanner, commands pertinent to document handling could be prominently presented to the user including commands for optical character recognition (OCR), document archiving, document printing, document faxing, etc. To cite another example, an interface could, alternatively, be configured for use in a recreation mode. Where the electrical device 102 is a scanner, commands typically used in a recreational setting could be prominently provided including commands for image processing, uploading of images to the Internet, emailing of images, etc. Notably, although particular commands are made more easily available to the user based upon the mode to which the interface is directed, this is not to say that other commands related to other electrical device functionalities are not provided with the interfaces. Instead, the placement and/or prominence of the commands made available to the user is altered to increase the ease of use with which the device can be operated in a particular mode.

Other default modes are feasible. For example, a children's mode can be provided in which, in addition to presentation of vibrant colors, fanciful shapes, and sounds that children may enjoy, only appropriate electrical device functionalities can be accessed. Typically, this involves the removal of one or more electrical device functionalities such that operation of the electrical device 102 can be limited. For example, an interface configured for operation in a children's mode can be arranged such that commands for uploading images to the Internet, printing, and the like are not presented to the user.

In addition to being designed for operation in particular modes, interfaces can be made available that are designed for persons with special needs. For instance, an interface can be provided for the visually-impaired which has large fonts, oversized buttons, and a simplified layout absent of superfluous imagery which can be more easily used by persons that have difficulty seeing. Such a layout further could be designed to facilitate more efficient screen reading by the user's screen reading software, where provided. Along the same vein, the layout of one interface could be arranged so as to simplify the selection of commands by persons who are physically impaired in some manner, for example, persons that have impaired motor skills. Such an interface again could have oversized buttons and apply different criteria in terms of registering selection of the buttons.

Figure 3:
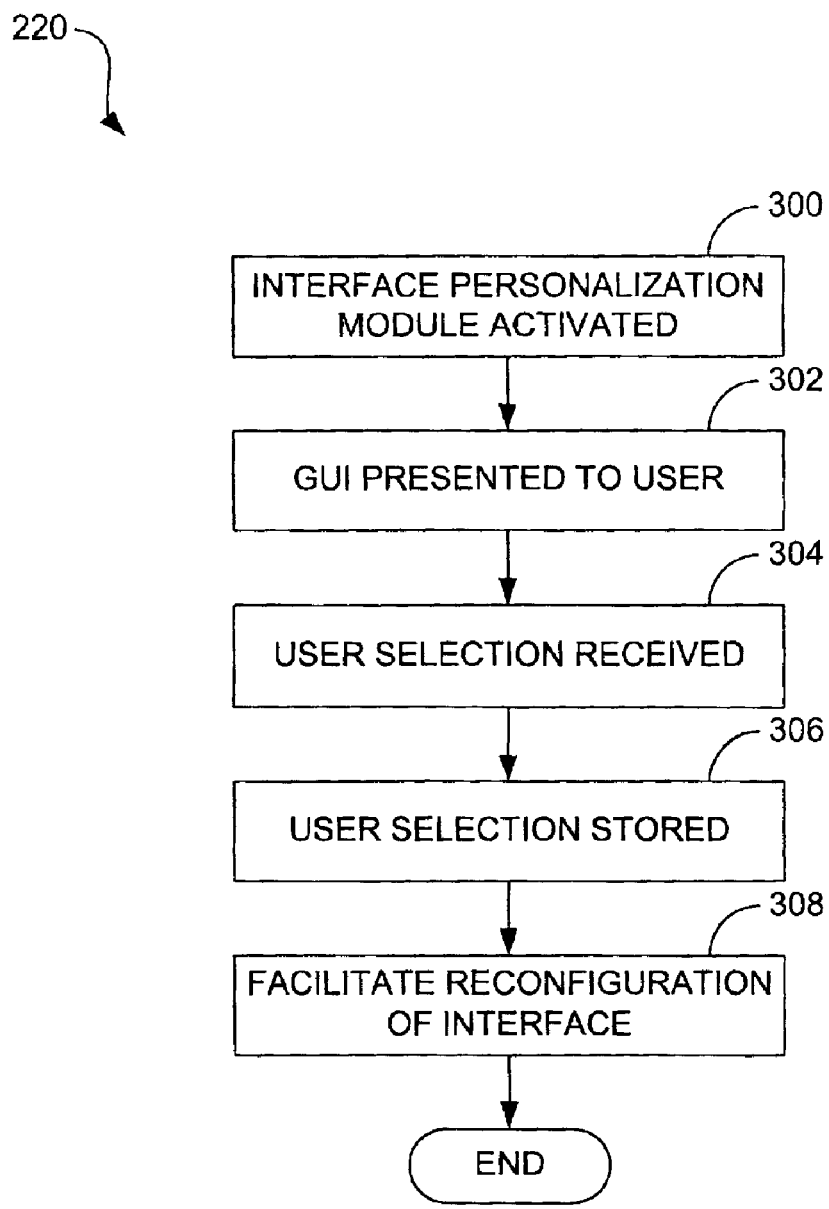
FIG. 3 is a flow diagram that illustrates an example of operation of an interface personalization module of the computing device shown in FIG. 2.

Irrespective of the nature of the interface, it can be easily selected by the user. FIG. 3 illustrates operation of the interface personalization module 220 to personalize an interface, be it the computing device interface presented with the display 206 or the electrical device interface presented with a display on the device display itself. With reference to block 300 of FIG. 3, the interface personalization module 220 is first activated. By way of example, this activation can occur in response to selection of a "personalize" or "customize" command of an interface presented to the user when the device solution application 216 is opened with the computing device 110. Once the interface personalization module 220 has been activated, a GUI can be presented to the user, as indicated in block 302, which presents the various default interface options to the user. As mentioned above, the selections can pertain only to aesthetics or can pertain to both aesthetics and functionality (e.g., operation in a particular mode).

At this point, the interface personalization module 220 can receive the user's selection, as indicated in block 304, and store it, as indicated in block 306. The interface personalization module 220 can then facilitate reconfiguration of the interface, as indicated in block 308. Where the interface to be changed is the local interface presented with the computing device 110, the interface personalization module 220 can effect the change directly such that the new interface selection is immediately presented to the user. Where, on the other hand, the interface to be personalized is the interface presented on the electrical device 102, facilitation can comprise transmission of the selected interface option to the electrical device 102 the next time communications between the computing device 110 and the electrical device are opened. At this point, flow for the interface selection is terminated.

It is to be noted that the interface adjustments noted above could be provided on a user-by-user basis so that the interface is personalized for each user of the computing device 110 and/or the electrical device 102. To attain this form of personalization, the device solution application 216 must recognize the user. Identification of the user can be effected through a common login procedure where the user's interface selection has been stored by the interface personalization module 220. Such storage can be obtained by simply "saving" a particular interface selection for each user that logs in.

Still other personalization options can be provided along with the default interfaces presented to the user. For example, the interfaces can vary depending upon the skill level of the user. In such a scenario, "beginner," "intermediate," and "advanced" interfaces can be made available that present commands for operations requiring increasing levels of familiarity with device operation. With such an option, the user can select an interface that most closely represents the user's level of understanding of the functionality and operation of the electrical device 102. As the user gains experience through use of the electrical device 102, the user can "graduate" to the next skill level of the interface.

Figure 4:
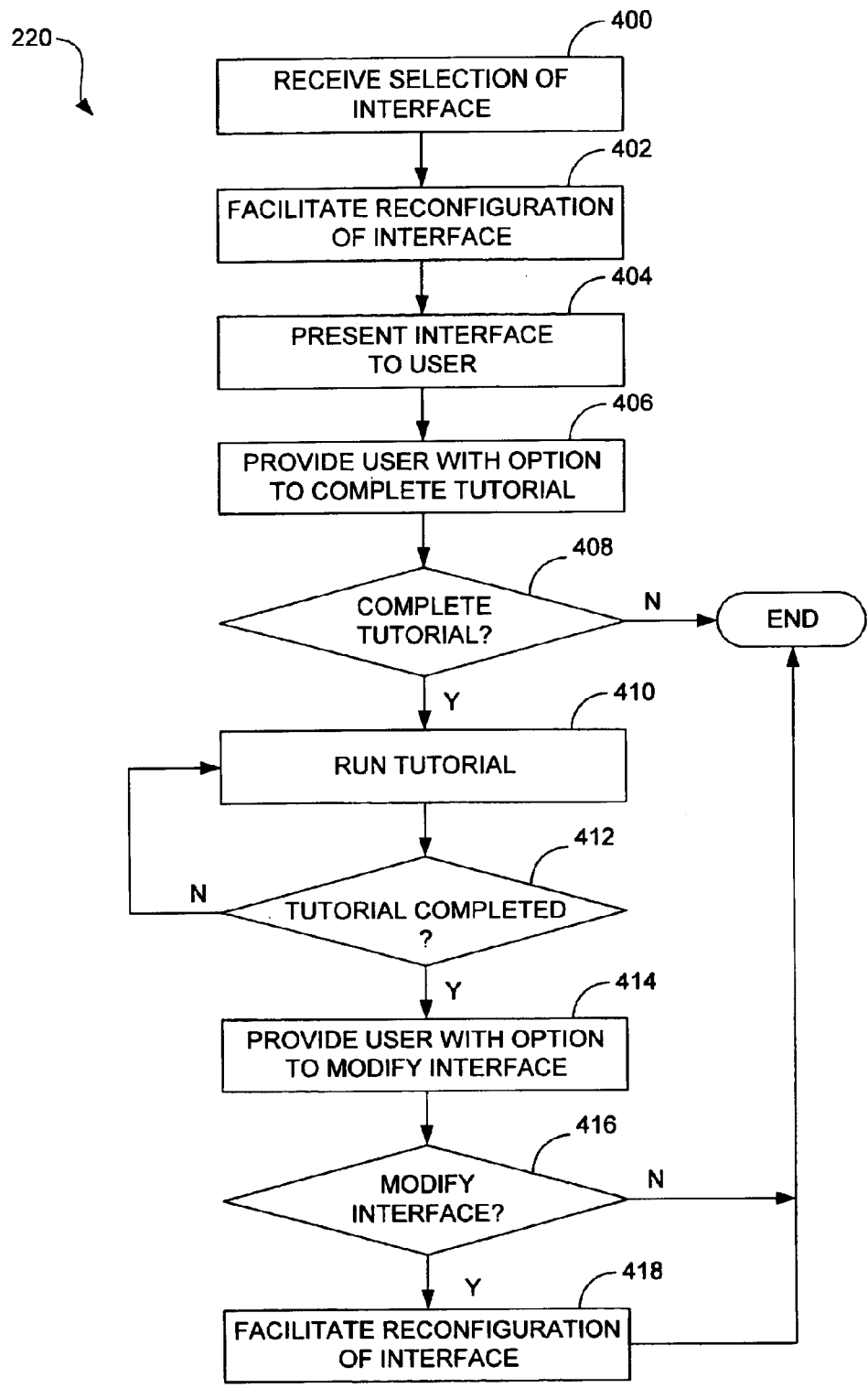
FIG. 4 is a flow diagram that illustrates a further example of operation of the interface personalization module of the computing device shown in FIG. 2.

In a variation on this concept, a dynamic interface can be made available to the user for selection in which the interface initially contains relatively simple functions and, as the user learns more about the functionality and operation of the electrical device 102, the interface gradually changes to offer more advanced commands. An example of operation of the interface personalization module 220 when the dynamic interface is selected is illustrated in FIG. 4. As indicated in block 400, the interface personalization module 220 can first receive the selection of the dynamic interface in the manner described above in relation to FIG. 3. Once this selection is received, the interface personalization module 220 facilitates reconfiguration of the interface, as indicated in block 402. The user can then presented with a relatively simple GUI, as indicated in block 404, that is appropriate for persons that are not very familiar with the functionality and operation of the electrical device 102.

At this point, the interface personalization module 220 can provide the user with the option of completing a tutorial that explains an interface command and the electrical device functionality associated with the command, as indicated in block 406. With reference to decision element 408, it can then be determined whether the user would like to participate in such a tutorial. If not, the user interface is left as is and flow in FIG. 4 is terminated. If, on the other hand, the user would like to complete a tutorial, flow continues on to block 410 at which the tutorial is run. The user can then participate in the tutorial and learn about one or more commands and their associated electrical device functionalities to become more familiar with electrical device operation and control. Referring to decision element 412, once the tutorial has been completed, the interface personalization module 220 can provide the user with the option to modify the interface to add the commands that the user learned about in the tutorial, as indicated in block 414.

Flow next continues to decision element 416 at which it is determined whether the user would like to modify the interface based upon his or her newly acquired knowledge about the operation and control of the electrical device 102. If not, flow is terminated. If so, however, the interface personalization module 220 facilitates reconfiguration of the interface, as indicated in block 418, such that one or more new commands are added to the interface. This process can be repeated such that multiple tutorials are completed by the user and multiple modifications are made to the interface until such time that the user has learned about substantially all of the interface commands (and therefore electrical device functionalities) and further has been given the opportunity add these commands to the interface. Notably, the user can be provided with the option to only participate in tutorials regarding functions in which the user is interested.

Figure 5:
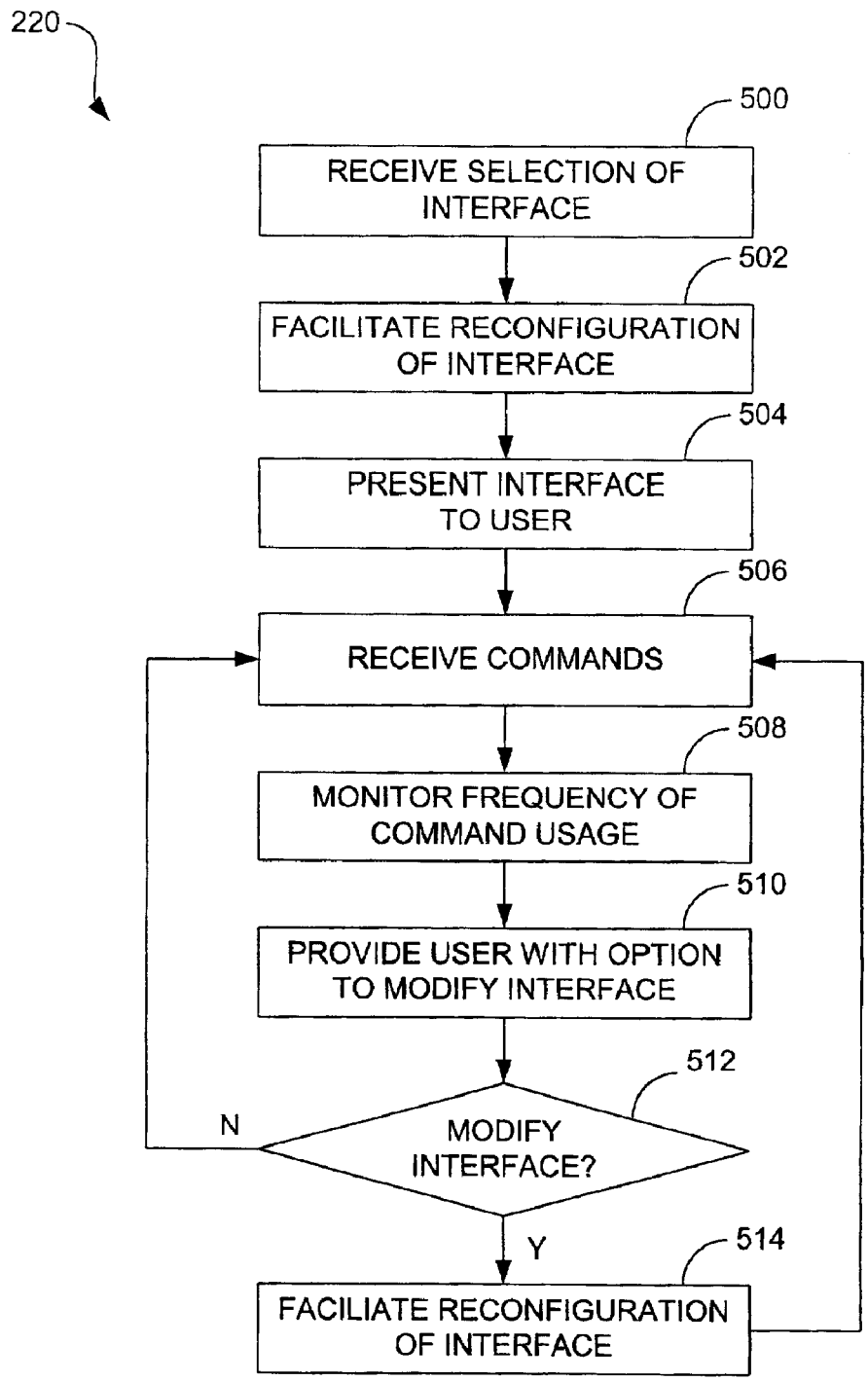
FIG. 5 is a flow diagram that illustrates a further example of operation of the interface personalization module of the computing device shown in FIG. 2.

In yet another option, an interface can be presented for user selection that is dynamic in terms of modifying the interface based upon the frequency of use of the various interface commands. Operating in this manner, the interface personalization module 220 is configured to track the user's selections and adjust the interface accordingly. An example of operation of the interface personalization module 220 in this mode is shown in FIG. 5. Beginning with block 500, the interface personalization module 220 can first receive the selection of the use tracking interface. Once this selection is received, the interface personalization module 220 facilitates reconfiguration of the interface, as indicated in block 502. The user is then presented with a GUI, as indicated in block 504, which can comprise a completely different interface or, optionally, can be configured in similar manner to any one of the other interfaces made available for user selection.

At this point, the interface personalization module 220 can receive user commands as the interface, and therefore the electrical device 102, is used, as indicated in block 506. As identified in block 508, the interface personalization module 220 monitors the frequency of selection of the various commands over time such that it can be determined which commands are most often used by that particular user. After the occurrence of some predetermined criteria, the user can be provided with the option of modifying the interface based upon the frequency of use of the various interface commands, as indicated in block 510. By way of example, the predetermined criteria can comprise entry of a particular number of commands, a particular number of times the interface is accessed and used, etc.

Flow next continues to decision element 512 at which it is determined whether the user would like to modify the interface based upon his or her frequency of use of the interface commands. If not, flow returns to block 506 at which the use of the various commands are again monitored. If so, however, the interface personalization module 220 facilitates reconfiguration of the interface, as indicated in block 514. In this embodiment, reconfiguration can comprise increasing the prominence of command identifiers (e.g., buttons), modifying the layout of the interface such that frequently used commands are displayed on the top level "screen" of the interface while less frequently used commands are provided in lower level screens or in drop-down menus, etc. Once the reconfiguration has been completed, flow can again return to block 506 and further monitoring of interface use can occur.

In a variation on the embodiment described above in relation to FIG. 5, more frequently used commands can, alternatively or in addition, be placed in a "favorites" list in which the commands are presented for selection in decreasing order of frequency of use, or can be placed in a "last 10 used" list which presents the last ten (or other number) commands that have been selected by the user. Arranged in this manner, the interface can simplify electrical device control by making it easier for the user to locate the commands he or she is most likely to use.

Figure 6:
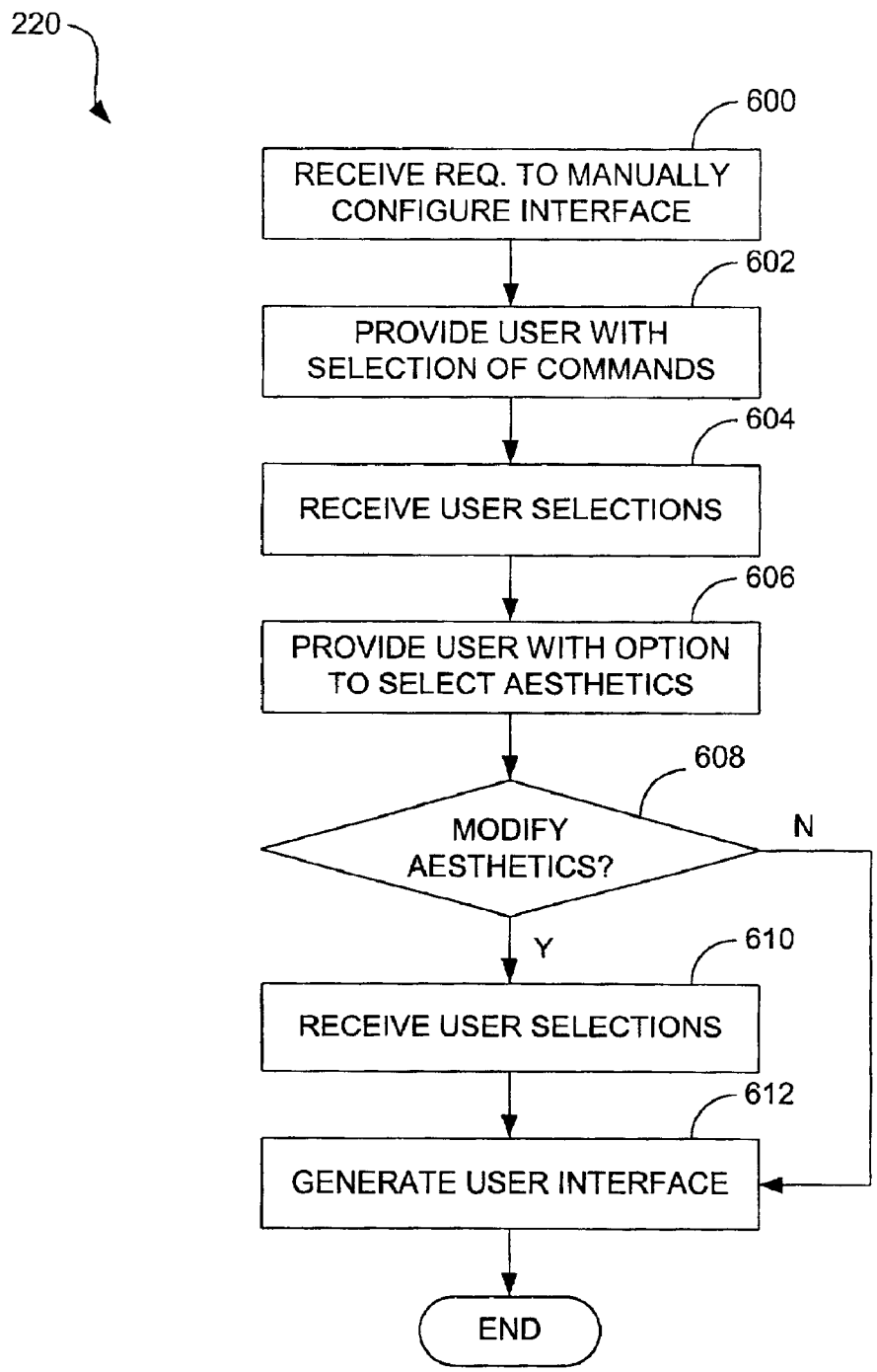
FIG. 6 is a flow diagram that illustrates a further example of operation of the interface personalization module of the computing device shown in FIG. 2.

In addition to providing the user with various default interfaces, the user can further be provided with an option to manually create or modify an interface. In some arrangements, the user can be provided with several different commands that can be selected and configured, if necessary, for the particular type of use the user foresees. Operation of the interface personalization module 220 in such a scenario is illustrated in FIG. 6. As indicated in block 600, the interface personalization module 220 can first receive a request from the user to manually create a new interface or modify an existing one. Once this request is registered, the interface personalization module 220 can present the user with various commands that can be selected for addition to the interface, as indicated in block 602. Where an existing interface is being modified, the user can further be provided with the option of removing existing commands. By way of example, the various available commands (for addition or removal) can be identified in one or more lists that are presented to the user. For instance, where the electrical device 102 comprises a scanner, these commands may include scan, copy, print, scan to a facsimile application, scan to a word processing application, scan to an image editor, scan to a website, etc.

The interface personalization module 220 can then receive the user's selections, as indicated in block 604. At this point, the interface personalization module 220 can further provide the user with the opportunity to choose/modify the aesthetics of the interface, as indicated in block 606. For example, the user can be provided with the opportunity to change the color scheme of the interface, select a default theme for the interface, select the positioning of the selected commands on the interface, select the look of the indicators (e.g., buttons) that will be used to chose the commands, etc. With reference to decision element 608, if the user would like to make selections as to aesthetics, flow continues to block 610 at which the user selections are received. If not, however, flow continues down to block 612 at which the interface personalization module 220 generates a user interface based upon the user's selections.

As a variation on the concept described above in relation to FIG. 6, the user further could be provided with the ability to save various different manually created/modified interfaces as separate interfaces available for selection. For instance, the user could create a business interface having the various commands he or she uses most often in a work context and a separate recreation interface having the various commands the user likes to use in his or her free time. In this manner, the user can select the user interface most relevant to the type of operations he or she will be conducting. Such capability may be particularly desirable for persons that use mobile computing devices, such as laptop computers, at work and at home. In such a scenario, the user could control electrical devices 102 at work using an interface adapted for a work, and later control electrical devices at home using an interface adapted for play.

Figure 7:
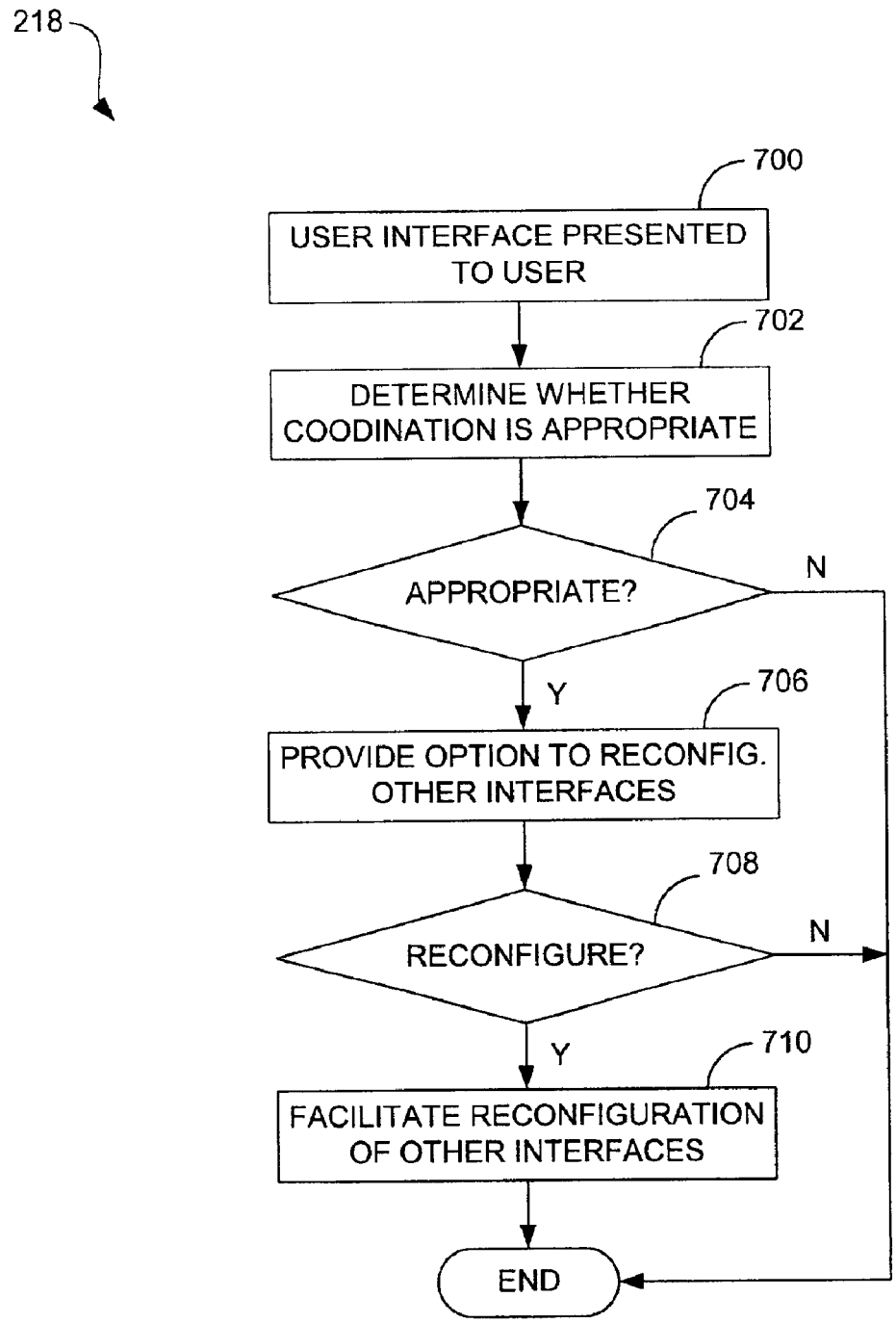
FIG. 7 is a flow diagram that illustrates an example of operation of an interface coordinator of the computing device shown in FIG. 2.

In that users often access and control various different electrical devices 102, the user may interact with various interfaces that separately control the different devices. Under such circumstances, the interfaces each may be different in look, feel, and operation, even where each interface is used to control electrical devices from the same manufacturer. Standardization of the various different interfaces would simplify use of the interfaces by increasing the user's familiarity with the layout of the interfaces. Moreover, standardization of personalized interfaces would permit the user to obtain the same desired arrangement and features across all electrical device interfaces or at least across those used with electrical devices from a particular manufacturer. Such standardization is particularly desirable where each of the electrical devices is similar in some manner. For example, scanners and digital cameras both relate to image capture and therefore share many of the same functionalities.

Where provided, the interface coordinator 218 can be used to provide for such interface standardization. An example of the operation of the interface coordinator 218 is shown in FIG. 7. Starting with block 700, a user interface can be presented to the user. By way of example, the interface can be one that the user had just selected, created, or modified in the manners described above in relation to FIGS. 3–6. At this point, the interface coordinator 218 can determine whether interface coordination is appropriate, as indicated in block 702. For instance, coordination may be appropriate where interfaces exist for two or more devices having similar functionalities (e.g., a scanner and a digital camera). With reference to decision element 704, if coordination is not appropriate, flow is terminated. If coordination is appropriate, however, flow continues to block 706 at which the user can be provided with the option of reconfiguring one or more other interfaces to coordinate them with the interface that was selected, created, or modified in block 700. It can then be determined whether the user wishes to reconfigure the other interfaces. If not, flow is terminated. If so, flow continues to block 710 and the interface coordinator 218 facilitates reconfiguration of the other interfaces, such that each has a similar look and feel and, to the extent feasible, comprises the same commands.

Although emphasis has been placed upon the configuration of the interface presented with the computing devices 110, it is to be understood that similar personalization of the interface on the electrical device 102 itself can also be obtained, albeit to a lesser degree. Therefore, where the device display comprises a touch sensitive screen (e.g., liquid crystal display) the arrangement and nature of "soft" buttons of the screen can be modified to personalize the interface. Similarly, where the device 102 comprises a non-touch sensitive display, the manner in which information is presented can be modified to personalize the interface.

What is claimed is:

1. A method for personalizing an electrical device interface, the method comprising:
   presenting a variety of different default interface options to the user, the default interface options each being associated with a default graphical user interface that comprises a plurality of interface commands that control operation of a separate electrical device that is one of a printer, a photocopier, a facsimile machine, a scanner, and a multifunction peripheral (MFP) device;
   receiving selection of a default graphical user interface made by a user; and
   transmitting an interface option selection to the separate electrical device to enable presentation of the selected default grahical user interface to the user in a display of the separate electrical device.

2. The method of claim 1, wherein the graphical user interfaces vary in terms of aesthetics.

3. The method of claim 2, wherein the aesthetics comprise at least one of color schemes, sounds, and themes of the graphical user interfaces.

4. The method of claim 1, wherein the graphical user interfaces vary in terms of types of commands that are presented with the interfaces and therefore types of control over functionality of the separate electrical device.

5. The method of claim 4, wherein the commands most prominently presented to the user with each graphical user interface pertain to a particular mode of operation of the separate electrical device.

6. The method of claim 5, wherein the mode of operation comprises one of a business mode, a recreation mode, a children's mode, a visually impaired mode, and a physically impaired mode.

7. The method of claim 5, wherein the mode of operation pertains to a skill level of the user using the separate electrical device.

8. The method of claim 1, further comprising assigning particular graphical user interfaces to particular users such that interface personalization is provided on a user-by-user basis.

9. The method of claim 1, wherein the graphical user interfaces vary in terms of modes of operation of the separate electrical device.

10. The method of claim 9, wherein the modes include a business mode focused on commands pertinent to document handling.

11. The method of claim 9, wherein the modes include a recreation mode focused on commands pertinent to at least one of image processing, uploading, and emailing.

12. The method of claim 9, wherein the modes include a children's mode that presents a graphical user interface that includes at least one of vibrant colors, fanciful shapes, and sounds that children may enjoy.

13. The method of claim 12, wherein the children's mode removes one or more electrical device commands so as to limit the functionality of the separate electric device when the children's mode is active.

14. The method of claim 9, wherein the modes include a visually-impaired mode that presents a graphical user interface that includes one or more of large fonts, oversized buttons, and a simplified layout absent of superfluous imagery.

15. The method of claim 9, wherein the modes include a physically-impaired mode that presents a graphical user interface that includes oversized buttons and that applies modified criteria in registering selection of buttons.

16. A system for personalizing an electrical device interface, the system comprising:
   means for presenting a variety of different default interface options to the user, each interface option being associated with a graphical user interface that comprises a plurality of interface commands that control operation of a separate electrical device that is one of a printer, a photocopier, a facsimile machine, a scanner, and a multifunction peripheral (MFP) device;
   means for receiving selection of a default graphical user interface made by a user; and
   means for transmitting a selected interface option to the separate electrical device to enable presentation of the selected default graphical user interface to the user in a display of the separate electrical device.

17. The system of claim 16, wherein the graphical user interfaces vary in terms of aesthetics.

18. The system of claim 16, wherein the graphical user interfaces vary in terms of modes of operation of the separate electrical device.

19. The system of claim 18, wherein the modes include a business mode focused on commands pertinent to document handling.

20. The system of claim 18, wherein the modes include a recreation mode focused on commands pertinent to at least one of image processing, uploading, and emailing.

21. The system of claim 18, wherein the modes include a children's mode that presents a graphical user interface that includes at least one of vibrant colors, fanciful shapes, and sounds that children may enjoy.

22. The system of claim 21, wherein the children's mode removes one or more electrical device commands so as to limit the functionality of the separate electric device when the children's mode is active.

23. The system of claim 18, wherein the modes include a visually-impaired mode that presents a graphical user interface that includes one or more of large fonts, oversized buttons, and a simplified layout absent of superfluous imagery.

24. The system of claim 18, wherein the modes include a physically-impaired mode that presents a graphical user interface that includes oversized buttons and that applies modified criteria in registering selection of buttons.

25. The system of claim 18, wherein the modes pertain to particular skill levels of the user in using the separate electrical device.

26. A method for personalizing an electrical device interface, the method comprising:
   presenting to a user a plurality of different electrical device commands that can be added to a graphical user interface used to control a separate electrical device that is one of a printer, a photocopier, a facsimile machine, a scanner, and a multifunction peripheral (MFP) device to enable the user to manually create a personalized graphical user interface for the separate electrical device;
   receiving user command selections;
   generating a personalized graphical user interface for use in controlling the separate electrical device, the graphical user interface being based upon the user command selections; and
   transmitting the personalized graphical user interface to the separate electrical device to enable presentation of the personalized graphical user interface to the user in a display of the separate electrical device.

27. The method of claim 26, further comprising receiving user selections as to interface aesthetics.

28. The method of claim 27, wherein the interface aesthetics pertain to one or more of a color scheme, a default theme, and the position of the selected commands.

29. The method of claim 26, further comprising storing the generated graphical user interface as an interface option that the user can select.

30. A system for personalizing an electrical device interface, the system comprising:
   means for presenting to a user a plurality of different electrical device commands that can be added to a graphical user interface used to control a separate electrical device that is one of a printer, a photocopier, a facsimile machine, a scanner, and a multifunction peripheral (MFP) device to enable the user to manually create a personalized graphical user interface for the separate electrical device;
   means for receiving user command selections;
   means for generating a personalized graphical user interface for use in controlling the separate electrical device, the graphical user interface being based upon the user command selections; and
   means for transmitting the personalized graphical user interface to the separate electrical device to enable presentation of the personalized graphical user interface to the user in a display of the separate electrical device.

31. The system of claim 30, further comprising means for receiving user selections as to interface aesthetics including one or more of a color scheme, a default theme, and the position of the selected commands.

32. The system of claim 30, further comprising means for storing the generated user interface as an interface option that the user can select.

* * * * *